US 8,065,682 B2

(12) United States Patent
Baryshnikov et al.

(10) Patent No.: US 8,065,682 B2
(45) Date of Patent: Nov. 22, 2011

(54) ENFORCING SYSTEM RESOURCE USAGE LIMITS ON QUERY REQUESTS BASED ON GROUPING QUERY REQUESTS INTO WORKGROUPS AND ASSIGNING WORKLOAD GROUPS TO RESOURCE POOLS

(75) Inventors: Boris Baryshnikov, Redmond, WA (US); Aleksandras Surna, Redmond, WA (US); In-Jerng Choe, Sammamish, WA (US); Alexandre Verbitski, Woodinville, WA (US); Ravishankar Rajamani, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1101 days.

(21) Appl. No.: 11/679,520

(22) Filed: Feb. 27, 2007

(65) Prior Publication Data
US 2008/0209428 A1    Aug. 28, 2008

(51) Int. Cl.
*G06F 9/46* (2006.01)
(52) U.S. Cl. ........................ 718/104; 718/100
(58) Field of Classification Search ........... 718/100–108
See application file for complete search history.

(56) References Cited

U.S. PATENT DOCUMENTS

| | | | |
|---|---|---|---|
| 6,859,926 B1 | 2/2005 | Brenner | |
| 7,020,878 B1 * | 3/2006 | Rhee et al. | 718/100 |
| 7,526,793 B2 * | 4/2009 | Andreev et al. | 726/2 |
| 2003/0088672 A1 * | 5/2003 | Togasaki | 709/226 |
| 2004/0153438 A1 * | 8/2004 | Rossiter et al. | 707/1 |
| 2004/0172385 A1 | 9/2004 | Dayal | |
| 2004/0205054 A1 * | 10/2004 | Evans et al. | 707/3 |
| 2005/0183084 A1 * | 8/2005 | Cuomo et al. | 718/100 |
| 2006/0026212 A1 | 2/2006 | Tsukerman | |
| 2007/0234365 A1 | 10/2007 | Savit | |
| 2007/0271570 A1 * | 11/2007 | Brown et al. | 718/105 |
| 2008/0034370 A1 * | 2/2008 | Huizenga | 718/104 |

OTHER PUBLICATIONS

Anonymous: "Quickspecs HP-UX Workload Manager", HP.com Nov. 2, 2006, 10 pages.
Zikupoulos IBM, "Managing Your DataWarehouse with DB2 QueryPatroller", IUDG' 2006, May 9, 2006, 46 pages.

* cited by examiner

*Primary Examiner* — Meng An
*Assistant Examiner* — Louis Diep
(74) *Attorney, Agent, or Firm* — Workman Nydegger

(57) ABSTRACT

A database can have multiple requests applied at one time. Each of these requests requires a specific amount of server resources. There can be a differentiation of user-submitted workloads between each other. These workloads are a set of queries submitted by different users. Each query can have specific resource limits. In addition, each set can have specific resource limits.

21 Claims, 16 Drawing Sheets

ENFORCING SYSTEM RESOURCE USAGE LIMITS ON QUERY REQUESTS BASED ON GROUPING QUERY REQUESTS INTO WORKGROUPS AND ASSIGNING WORKLOAD GROUPS TO RESOURCE POOLS

TECHNICAL FIELD

The present specification relates generally to databases and in particular to resource allocation for different workloads.

BACKGROUND

In the computer industry, databases are used for an array of purposes ranging from credit card billing to network maintenance. Databases help make worldwide commerce possible (including e-commerce) as well as allow for massive amount of record keeping and record storage. Many databases rely on servers for general operation. Databases function in conjunction with computer code often written in database specific languages.

Structured Query Language (SQL) is a programming language commonly used in databases with several variations available. There are proprietary versions of SQL; for example, Transact-SQL is a specific proprietary version of SQL. In many instances, SQL operates on databases implementing relational database management systems (RDBMS). This bases a database model on first order logic as well as representation of objects. SQL servers can also function as object-orientated databases. Other database languages exist besides SQL including XQuery, which can be used for various functions such as extracting information from a database.

Databases are designed to process multiple concurrent requests. For example, multiple people can make a credit card purchase at the same time over the Internet. A central database server can record each one of these transactions at the same time with each transaction requiring a specific amount of server resources. In addition, each transaction can require different amount of resources to complete a successful operation and a database server can provide those resources. Moreover, a database server can handle a multitude of different requests all at the same time. For example, one user can be making a purchase with a credit card while another user signs up for a new account. Both operations require use of the same resource, system memory.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

In many instances, multiple distinct workloads are present on a server. However, the server does not differentiate workloads and only allocates resources in the order in which they are requested. The subject specification discloses a resource governor specifically in conjunction with a server. Each incoming request is associated with a workload group. These workload groups represent a set of user queries to be governed. Each workload transfers into a pool and the resources are limited to each workload based on a pool policy for a pool in which each workload resides. This allows for the limitation of resources based on policies for requests defined via workload group and resource pool policies as opposed to mere request order.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
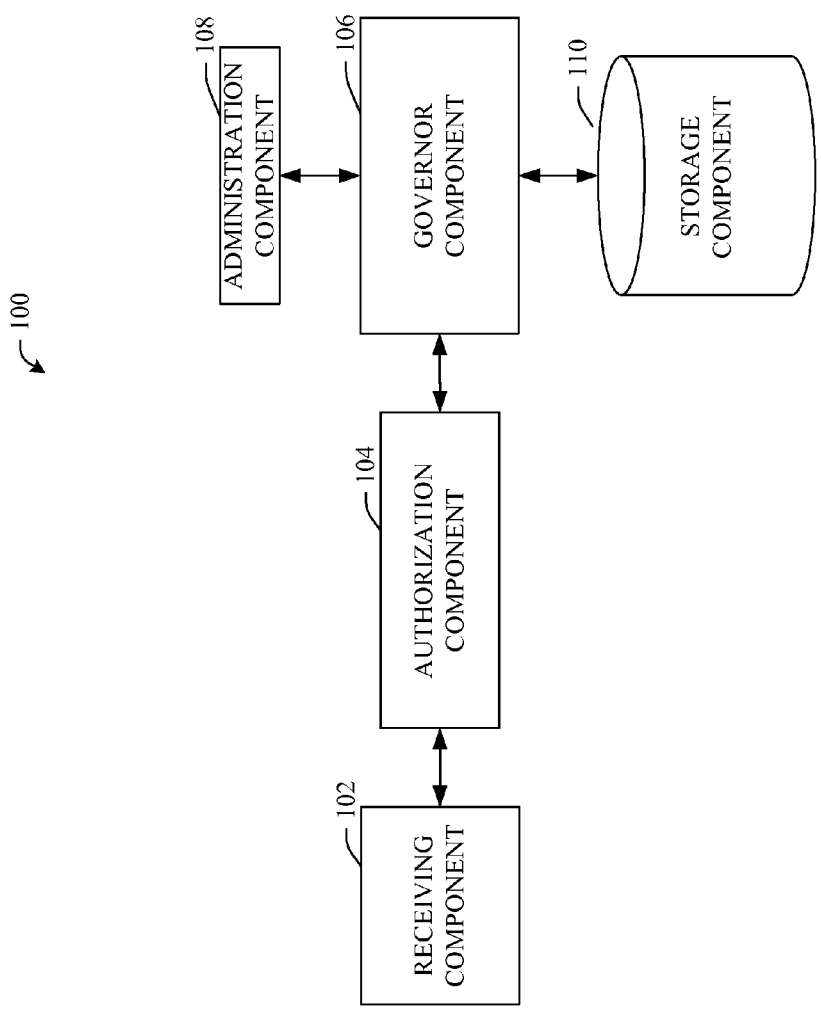
FIG. 1 illustrates a representative database server in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter. Numbers between ** in computer code indicate reference to related drawings.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components. The terms "workgroup", "workload group", and the like are to be used interchangeably.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

One benefit of the subject specification is this allows for a differentiation of user-submitted workloads (e.g., a set of queries submitted by various users) between each other. Another benefit of the subject specification is it allows for specifying resource limits for a single query. A further benefit of the subject specification is it allows for specifying limits for a set of queries (e.g., a workload as a whole). Further, a set of workloads can be managed as a whole when combined inside a pool. This gives clear distinction between what a user operates in and segmentation of server resources. The subject specification allows for prioritization between workload groups that are combined inside a pool. In the subject specification there can be generic classification user defined functions (UDF), which can be written by a user and reflect an individual user's business logic.

FIG. 1 discloses an example configuration of components in a database server 100 disclosed in the subject specification. A user makes a request into a receiving component 102. A common request is to store information into a page of database storage. The request travels to an authentication component 104 that checks to make sure the user has permissions to make the intended request. A request may be from an unauthorized user, so the authentication component 104 can reject this request. If the user is not authorized to make the intended request, then the request can be denied. The request travels through the authorization component to a governor component 106.

The governor component 106 regulates the resources in a database sever 100 (e.g., a SQL Server). The governor component 106 functions through an administration component 108. The administration component 108 establishes all of the functionality of the governor component 106. For example, a server administrator can set specific policies for resources through the administration component 108 to the governor component 106. One policy could be all requests of a particular type can use 30% of a particular resource regardless of any other requests. Therefore, if two entries of such type take place, each will have 15% of the given resource. The administration component 108 can integrate with the receiving component 102 or it can stand as its own entity. There can also be a storage component 110 that assists in storing information, such as the queries made and which requests assign to each workload group. However, it possible that a high amount of storing takes place on the individual components disclosed in FIG. 1.

Figure 2:
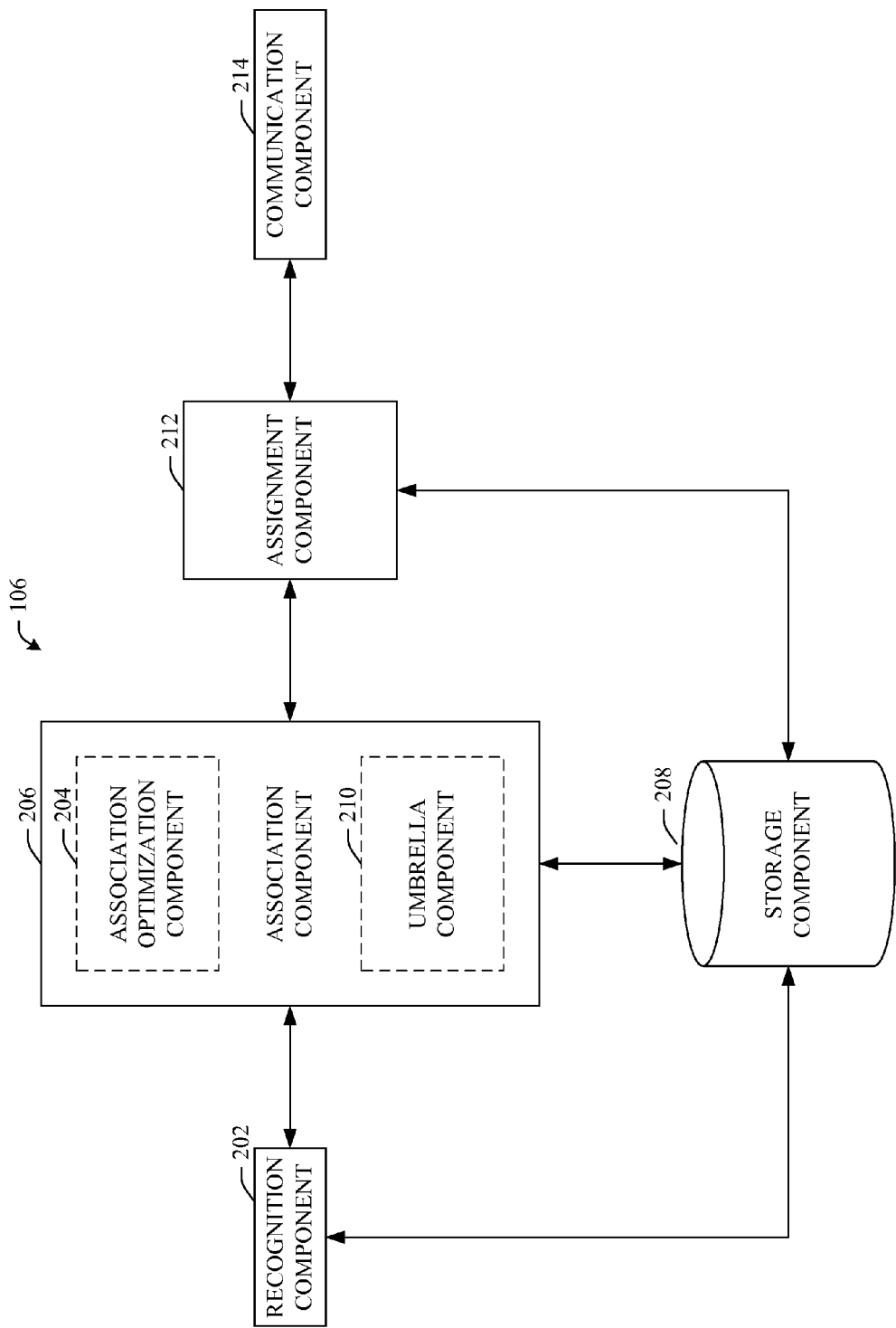
FIG. 2 illustrates a representative governor component in accordance with an aspect of the subject specification.

FIG. 2 discloses an example governor component 106 in FIG. 1. A recognition component 202 allows the governor component 106 to know that a request has been made. The receiving component 102 in FIG. 1 can receive a variety of information. The recognition component functions to recognize a request that includes queries for network resources. This can take place for different information gathered by the receiving component 102.

An optimization component 204 (e.g., an association optimization component) functions to avoid redundant classification from an association component 206. In one embodiment, the optimization component 204 is integrated with the association component. If classification attributes are already known for a request, then there is no need to pass through the association component 206 since the classification is already known and a request can pass directly to a storage component 208. This optimization can operate in several different fashions. In one embodiment of the subject specification, a first request contains information that five following requests will contain the same attributes. The association optimization component can ask an association component the first request's classification and apply that classification to the following five requests.

An association component 206 (e.g., a UDF classification component) associates each incoming request with a workload group. In one embodiment of the subject specification, there is a plurality of workloads in which to choose from stored in a storage component 208. From this plurality of workloads, the association component 206 selects a workload in which to associate with an incoming request. In another embodiment, the association component 206 can generate its own workload groups through a generation component included in the association component 206. The association component 206 links a request with a generated workgroup.

Each generated workload association can be stored on the storage component 208 for later use.

An umbrella component 210 can function for at least one of two specific groups: system groups and/or default groups. In one embodiment of the subject specification, the umbrella component 210 can integrate with the association component 206. In another embodiment, the umbrella component 210 functions as an independent component to the association component 206. A system group functions for all requests that are executed on behalf of a system (e.g., a database consistency check). Since these are often not controllable by a user, a UDF classification system may not properly associate the request. Therefore, the umbrella component 210 places the request in a system group. A default group associates requests that were not associated with a workload group by the association component 206. For example, if there is a failure by the association component 206, the umbrella component 210 can make sure all requests at least enter into a default group. The umbrella component 210 functions to make sure no request functions without an assignment to a workload group. In an alternative embodiment, system benefit requests can be associated in the association component 210.

Assignment component 212 assigns each workload group to an appropriate resource pool. There can be multiple appropriate resource pools in which to assign a workload group or there can only be one appropriate resource pool. The results of the any assignment can be stored in the storage component 208. In typical operation, there is a standard system pool and default pool, both to operate for any requests that fall into a system group or a default group.

Communication component 214 allows for changing to overall polices of the governor component 106. An administrator can desire to change the policy of the governor component 106. For example, the administrator can have a desire to limit the percentage of memory resources that can be used by requests in the default group. The administrator accesses the resource governor through the communication component 214.

Figure 3:
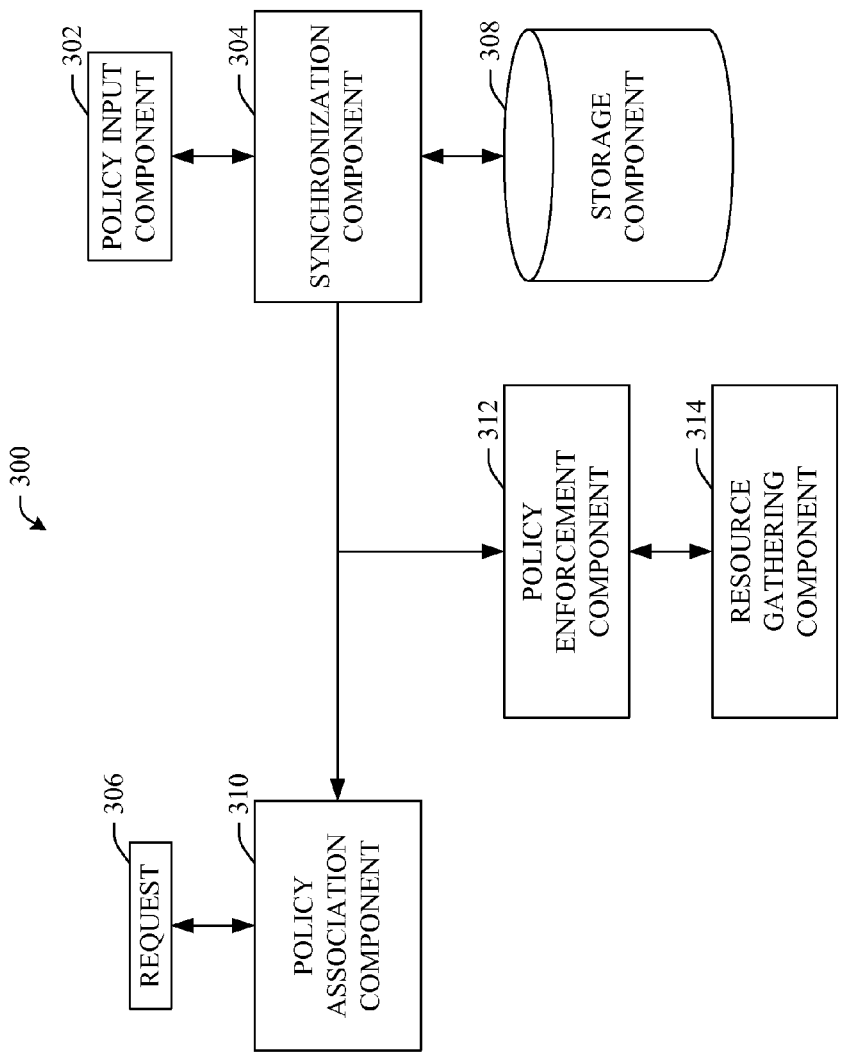
FIG. 3 illustrates a representative configuration of components with an aspect of the subject specification.

FIG. 3 disclosed an example server configuration of components 300 disclosed in the subject specification. An administrator enters information into a policy input component 302 about policies that should be followed concerning resource allocation. The information specifically relates to resource policies of server. A synchronization component 304 provides consistency for the server. For example, there can be a request 306 taking place when there is a change of a policy. The synchronization component 304 makes sure that the correct policies are applied to the correct requests. Information inputted concerning policies is stored in a storage component 308 so the server can reference stored polices each time a request enters. A policy association component 310 applies proper policies to an incoming request 306. The request 306 with policy information travels through a policy enforcement component 312 that attempts to comply with policies set through the policy input component 302. A resource gathering component 314 obtains the resources allowed by the policy enforcement component 312.

Figure 4A:
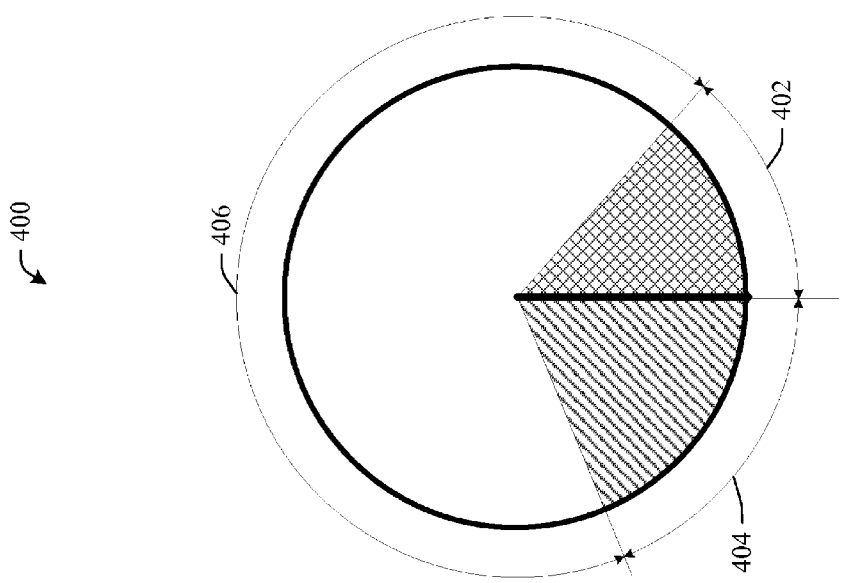
FIG. 4a illustrates a first part of a representative graphical depiction of resource allocation in accordance with an aspect of the subject specification.
Figure 4B:
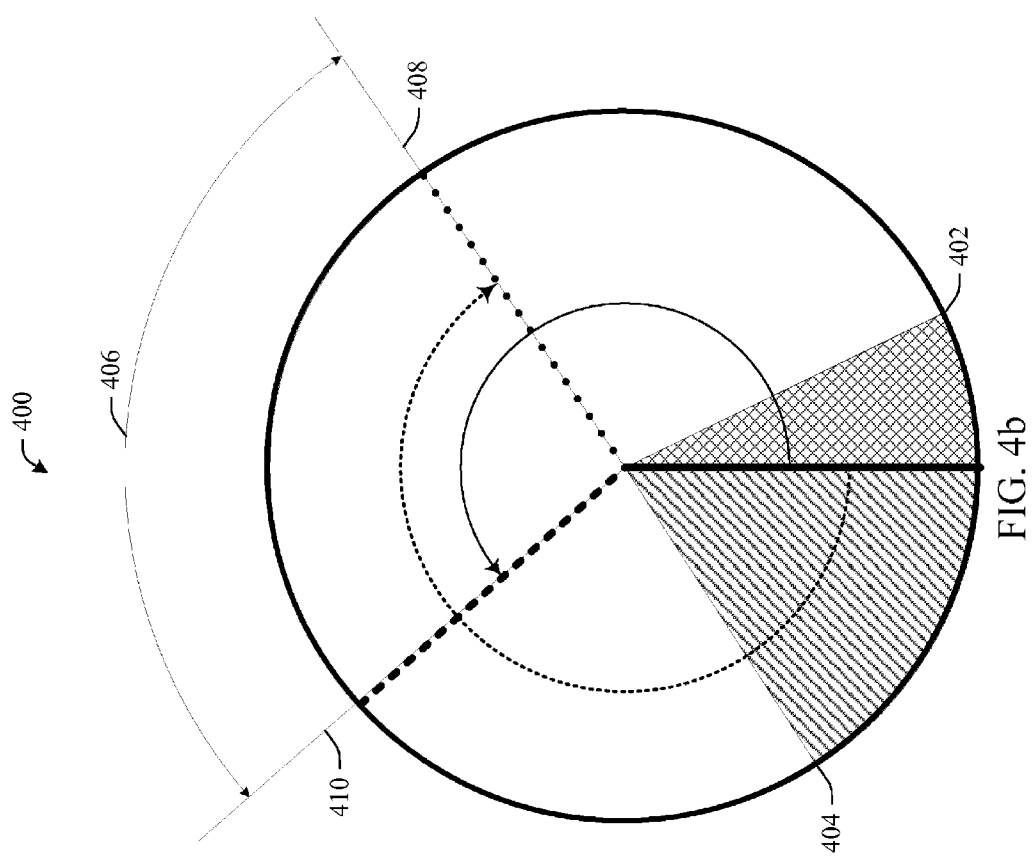
FIG. 4b illustrates a second part of a representative graphical depiction of resource allocation in accordance with an aspect of the subject specification.
Figure 4C:
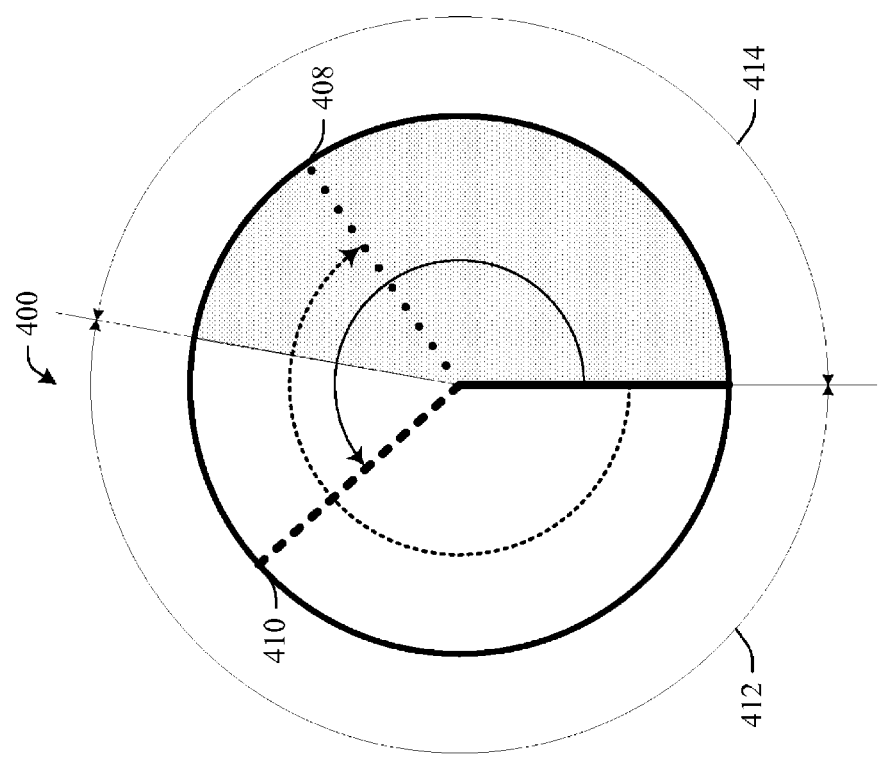
FIG. 4c illustrates a third part of a representative graphical depiction of resource allocation in accordance with an aspect of the subject specification.

FIG. 4*a* to FIG. 4*c* discloses example graphical configurations of resource allocation in accordance with the subject specification. For example, a resource can represent a specific resource (e.g., CPU bandwidth or memory). A whole circle represents a specific resource. The drawing shows the resource allocation according to two pools: Pool 1 and Pool 2. Each pool has an effective minimum portion (e.g., MIN1, MIN2) that is not shared by any other pool as well as an effective maximum portion (e.g., MAX1, MAX2). The effective maximum portion for each pool is the MAX for any pool is 100 minus the sum of the effective minimum portions of all other pools.

Free resource between an effective minimum portion and an effective maximum portion is shared between pools. This is a situation where the sum of all the effective minimums are less then 100% or the effective maximums are greater then zero. In addition, the effective maximum for a pool is greater then the effective minimum for a pool. If an effective maximum portion for a pool is greater then zero and equal to the effective minimum portion, then the pool has a fixed size that is not shared with other pools. If the sum of the effective minimum portions is equal to 100%, then there is no room for shared parts, even if the effective maximum portion is greater then the effective minimum portion.

FIG. 4*a* discloses a resource set with MAX for the resource set at 100%. A reserved part of Pool 1 is designated at MIN1 402. A reserved part of Pool 2 is designated as MIN2 404. Area not designated at MIN1 or MIN2 is free resource shared between two pools 406. MIN designates a minimum amount of resource that is available to a resource pool. FIG. 4*b* discloses a resource set with MAX for the resource set below 100%. MIN1 and MIN2 402,404 are similar to or the same as the MIN1 and MIN2 402, 404 of FIG. 4*a*. Pool 1 has a MAX1 408 and Pool 2 has a MAX2 410. Each MAX 408, 410 show the maximum amount of resource available to each pool. The maximum amount of free resources is shown 406. FIG. 4*c* discloses usage of resources by Pool 1 412 and Pool 2 414 when a resource is consumed. Based on the load, an actual distribution varies depending on a load. There is a distinct usage for Pool 1 and Pool 2. It should be noted that the split between usage of each pool lies in the free resource in each pool.

Figure 5:
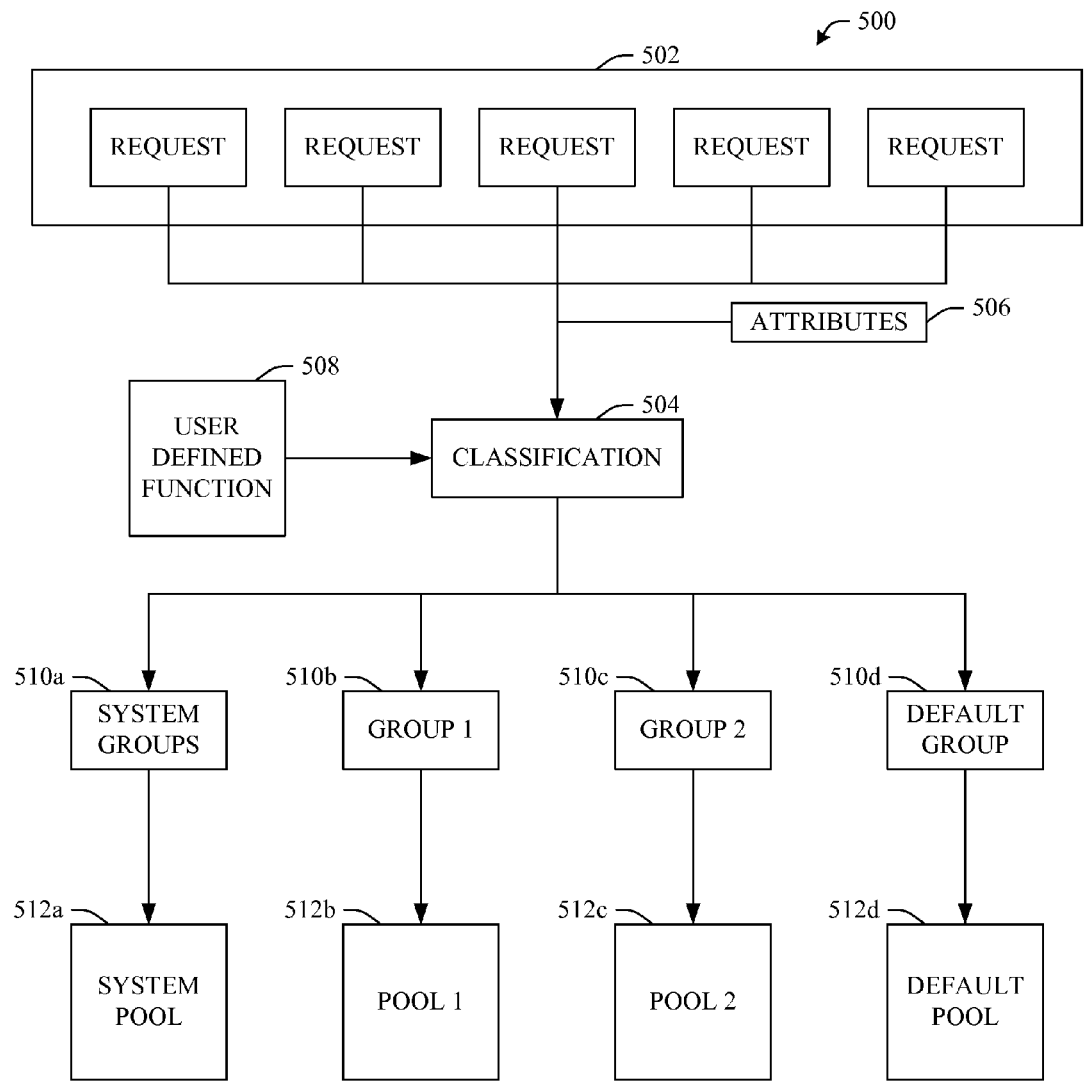
FIG. 5 illustrates a representative configuration of allocation and assignment in accordance with an aspect of the subject specification.

FIG. 5 displays an example implementation 500 of the subject specification. A number of requests are made into a database server 502. Each request is assigned a classification to a workload group based on both classification logic 504 as well as attributes specific to each request 506. In one embodiment of the subject specification, the classification is determined in conjunction with a UDF 508. The UDF 508 can contain classification logic and uses that logic to attribute every request to a workload group.

In a further embodiment, the classification 504 can function in conjunction with an association optimization component. The association optimization component can limit the number of requests that require classification. This can be done by comparing if an attribute has changed. For example, when classification attributes 506 are known for requests that follow a first request. This example would be if a first request has 'attributes X' which assigns that request into a classification 504. In the example, it is known that the next four requests have the same attributes as the first request. Therefore, since the attributes are the same and the classification of these attributes is known, there does not need to be classification of the next four requests and they can be immediately assigned a workload group. There can also be an explicit classification. Explicit classification allows a user to specify directly which workload policy to apply to the user's request. In one embodiment of the subject specification, all requests are classified into workload groups. This is done either by a classifier UDF or explicit classification.

A workload group 510*a-d* is a user-based concept that groups all requests that are similar based on a set of classification rules. A workload group 510 allows a system to monitor resource consumption by the requests inside of a group. There can also be uniform policy applied to the requests in a group (e.g., the each request in the group cannot use more then an allotted uniform amount). For example, when using a uniform policy, if there are five requests in a workload group 510, then at maximum each request can use 20% of a particular resource.

The workload groups 510 define the individual policies in which they follow. In common operation, there are two special workload groups: a system group 510*a* and a default group 510*d*. However, it is possible that there be more then one system group. One system group is commonly an implementation detail. The system group 510*a* aggregates all requests that are executed on behalf of a system. This group is not controllable by a user. The default group 510*d* aggregates all requests that were not placed into other groups. This is essentially a catchall group that makes sure every request is placed into a workload group. Once a workload group membership is determined, the workload group defines the resource policy, which will be applied to this given request through a group policy. The workload group also defines an overall resource policy as applied to all requests in a given workload or groups of workload though a pool policy.

A resource pool 512*a-d* is an arrangement of physical resources on a server. Each pool should be arranged where a part of the pool overlaps other pools (e.g., maximum possible resource consumption) and a part that is unique to the pool (e.g., minimum reservation). The system group 510*a* and the default group 510*d* are placed in a system pool 512*a* and a default pool 512*b* respectively.

Figure 6A:
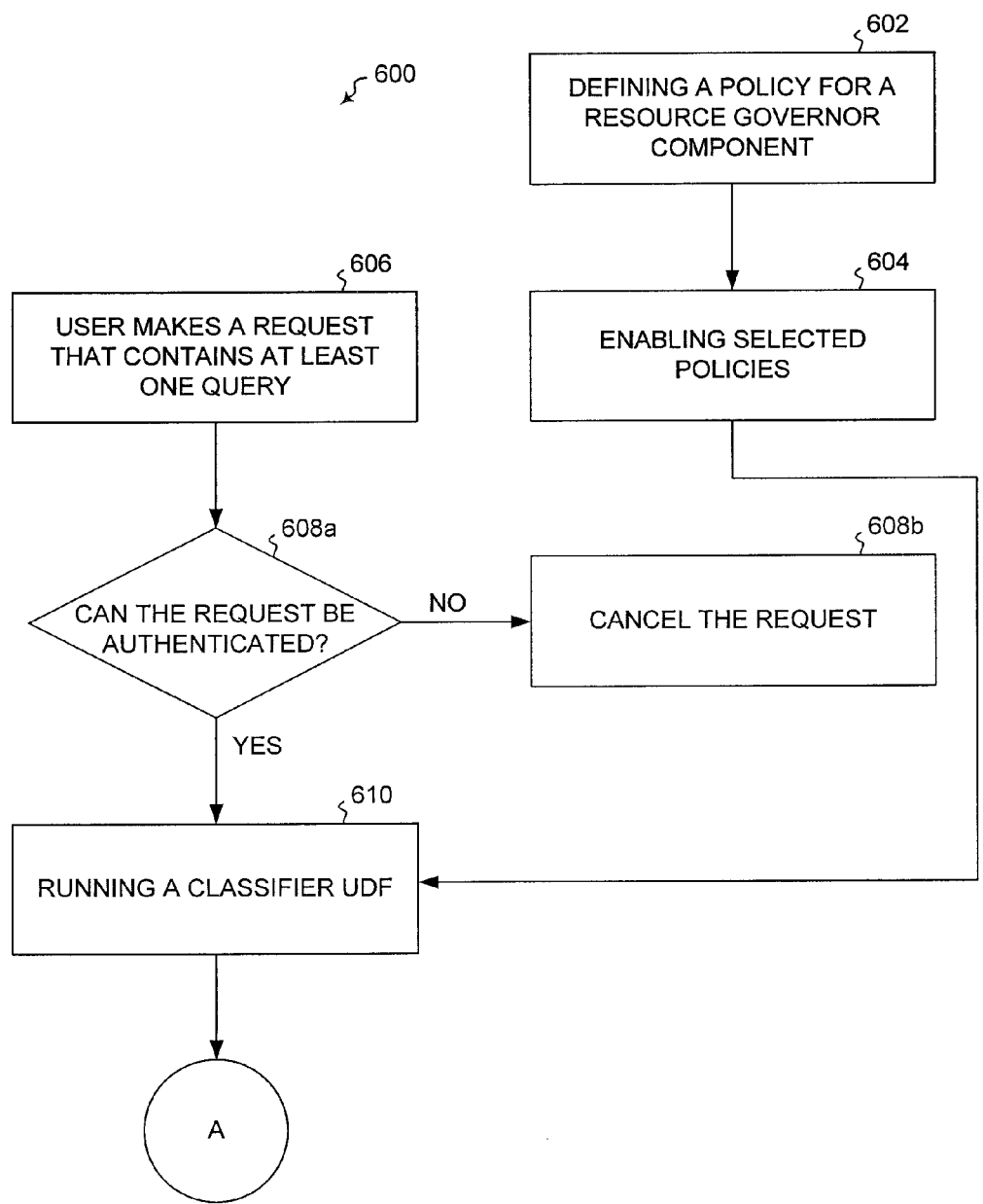
FIG. 6a illustrates a first part of a representative methodology in accordance with an aspect of the subject specification.
Figure 6B:
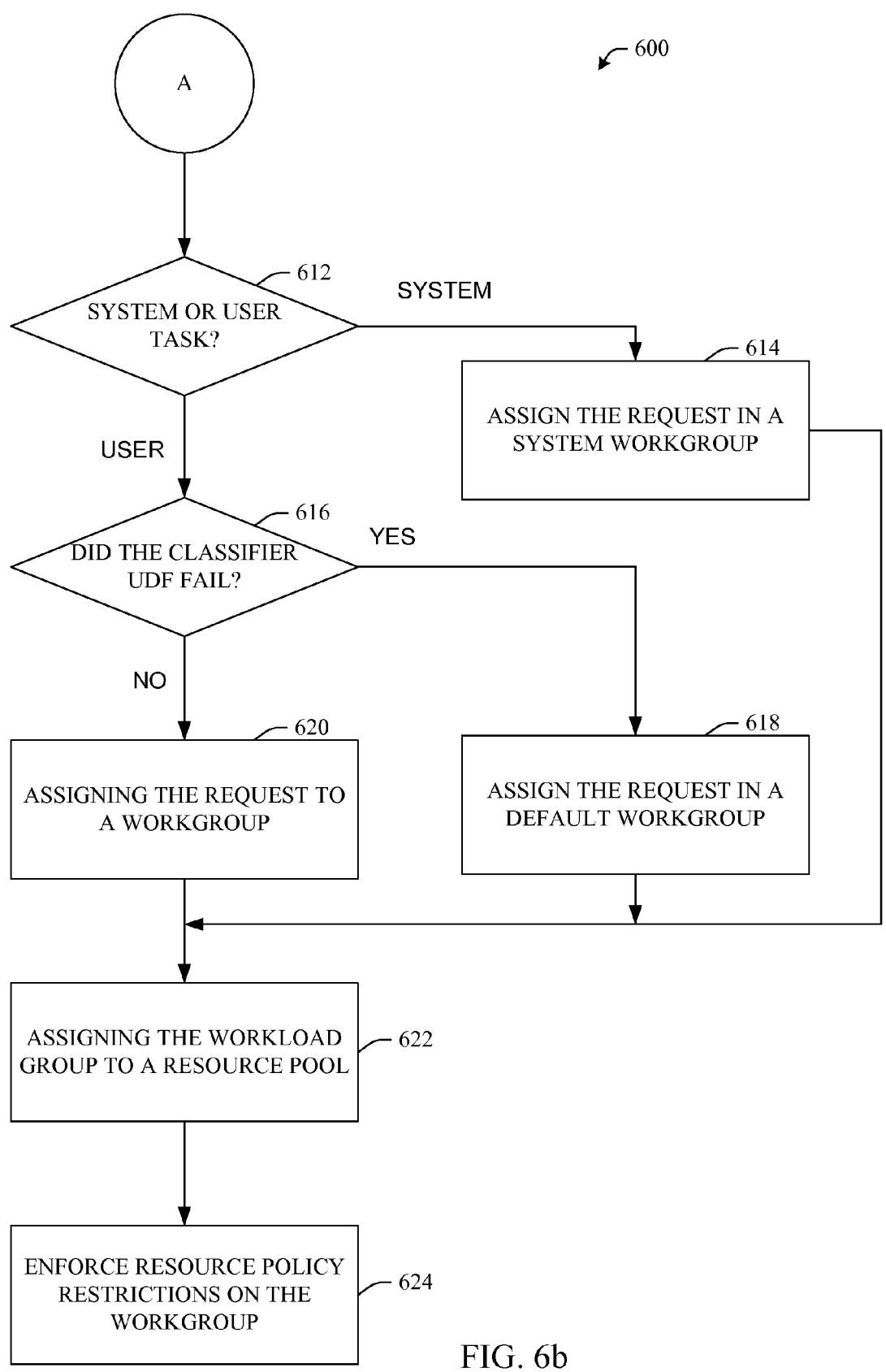
FIG. 6b illustrates a second part of a representative methodology in accordance with an aspect of the subject specification.

FIG. 6*a* and FIG. 6*b* discloses an example methodology 600 of the subject specification upon a server (e.g., a server operating in conjunction with Structured Query Language). A database administrator defined a policy for a resource governor 602. The policy can be set with a number of different characteristics. Some of characteristics can be classification UDF, workload groups, resource pools, and mapping between groups and pools. The selected policies are enabled 604, meaning that the policies are enacted by a resource governor. A user can select to make a request on a database server and the request contains at least one query 606.

A check takes place on if the request can be authenticated by an authentication component 608*a*. If the request cannot be authenticated, then the request is cancelled and denied 608*b*. If the request can be authenticated, then the methodology can continue to the next action. A classifier UDF of a resource governor is run 610 and the request is preliminarily assigned to a workload group based on rules specified in a classifier UDF in many instances. Since a workload group defines resource usage for associated requests (e.g., requests associated with the workload group), it is known how much resources should be allocated to a query. Thus resource usage by the query is now controlled though the workload group and resource governor.

A check is run on behalf of the server to determine if the request operates to benefit the server 612 (e.g., is it a system task or a user task). If this is the case, then the request is placed into a system specific workload group 614. A request that is not for the benefit of the server carries with a preliminarily assignment. In another embodiment of the subject specification, the check 612 takes place before the assignment. Another check takes place to determine if the classifier UDF failed 616. Any request that does not become assigned to a workload group enters into a default workload group 618. A non-failure, non-system benefit request enters into a standard workload group based on the preliminarily assignment 620.

Each workload group is assigned to a resource pool 622. Resource consumption by multiple requests is defined by a resource pool policy. The resource policy is implemented on the appropriate workload group 624. This policy is commonly set by a database administrator in action 604. Resource consumption by multiple requests is defined by the resource pool policy. This policy controls overall resource usage if there are multiple requests present in a common group/pool combination. Having separate groups and pools allows for flexibility of defining workloads for a user's point of view (e.g., groups) while dividing server resources (e.g., pools) in a manger independent of user workloads.

Figure 7:
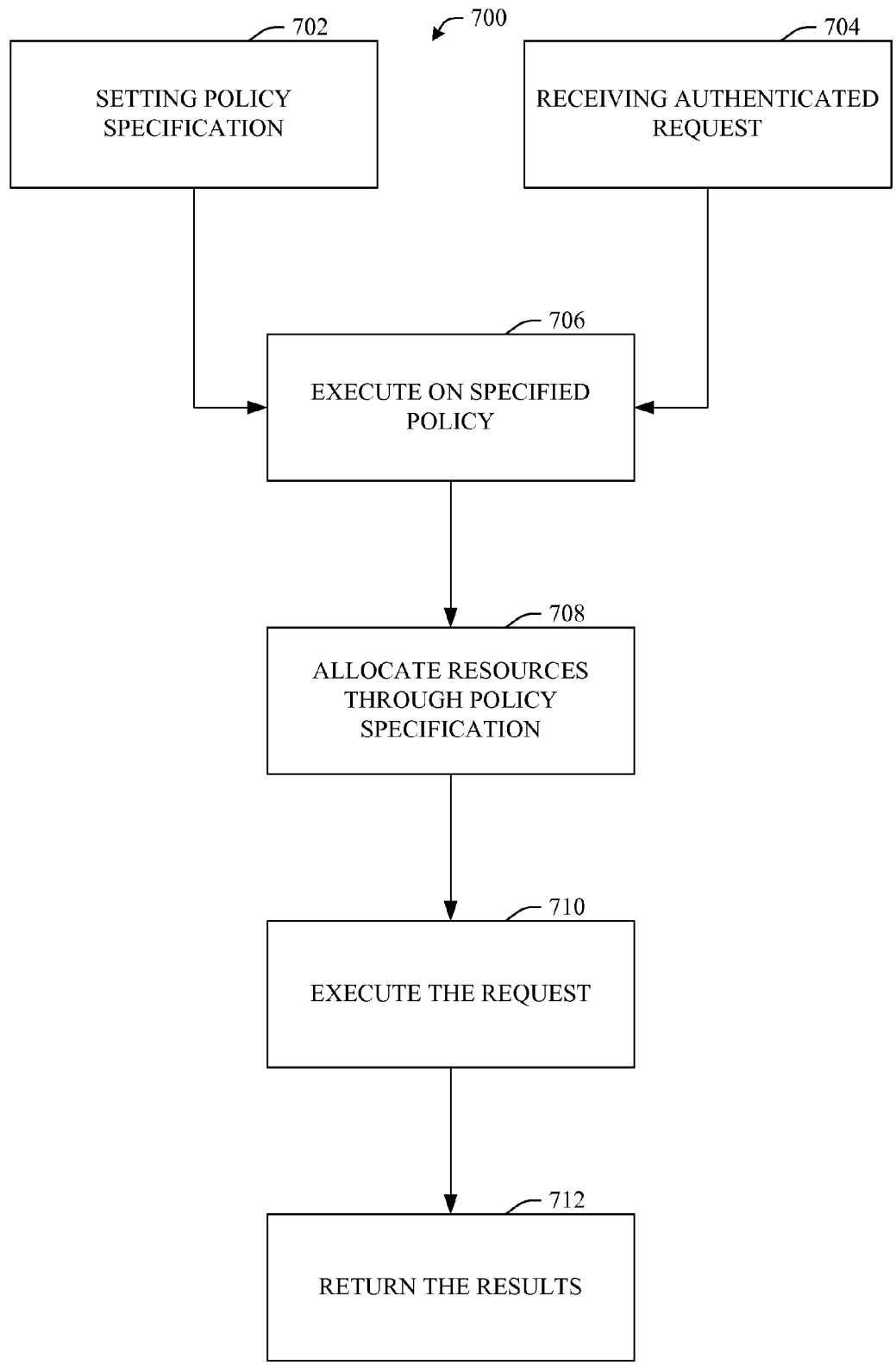
FIG. 7 illustrates a representative methodology in accordance with an aspect of the subject specification.

FIG. 7 discloses an example methodology 700 for practicing the subject specification. An administrator sets policies specification for resource allocation for a system 702. A system receives a request to use resources on a server 704. Action 706 executes the specified policy. Conventional resource allocation does not allow for execution of a specified policy. Based on an executed policy, the system allocated the resource accordingly 708. The request is then executed 710 and necessary results from the request are transferred 712.

For example, a database administrator sets a policy 702 that a non-management employee can never use more then 10% of resource X from a server. A non-management employee makes an authenticated request 704 on the server to use resource X. Based on the request to use resource X, the server executes the policy 706 that only 10% of resource X can be used for the request. The appropriate amount of resource X is allocated through the policy specification 708 (e.g., 10% of resource X). The request from the non-management employee is executed 710 and any necessary requests are returned 712.

In another example, continuing from the previous example, the database administrator also sets a policy specification that if a management employee makes a request of resource X, then he/she has unlimited access to resource X and this is a primary policy. The non-management employee makes a request to use 5% of resource X. Then, after the non-management employee makes a request, the management employee makes a request to use 100% of resource X. The policy specification temporarily stops the request of the non-management employee and allows the request of the management employee to use 100% of resource X. Once the request of the management employee is compete, the request of the non-management employee can resume. This example illustrates how the methodology allows defined polices to govern resource allocation and not the order of time a resource request is made (e.g., first in time has first access to a resource). In addition, the disclosed methodology 700 allows for specific allocation of resources for administrative purposes (e.g., allowing a person to use only 10% of a resource provides resources for at least ten users).

Figure 8:
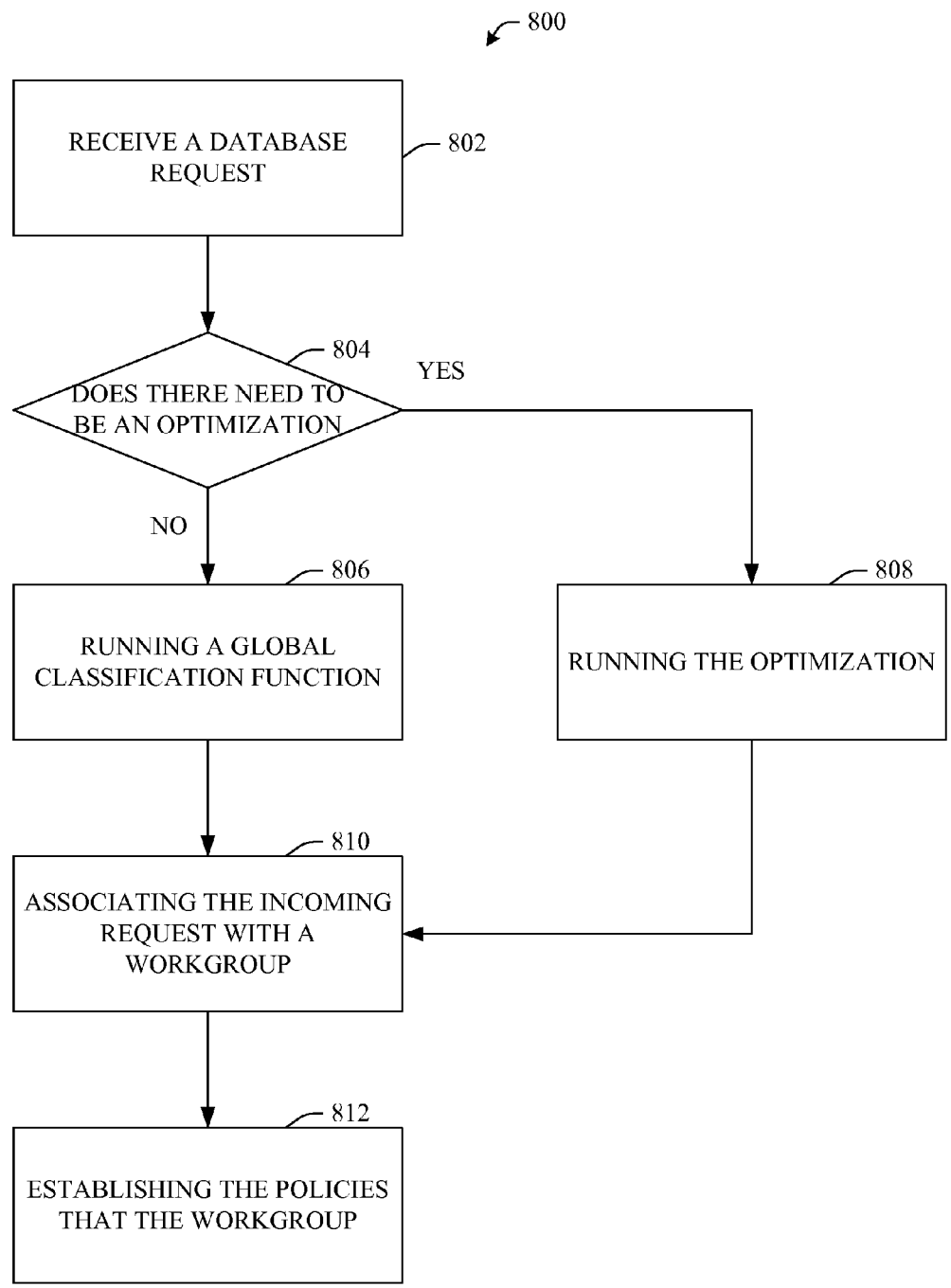
FIG. 8 illustrates a representative methodology in accordance with an aspect of the subject specification.

FIG. 8 discloses an example methodology 800 in accordance with the subject specification. A request is received 802, commonly by a receiving component of a database server. A check takes place to determine if the request should be optimized 804. A global classification function is run on the request 806 if there is no need for an optimization, commonly a global user-defined classification function. A global classification user defined function associates resource limitations with each individual request 806. If there is a need for an optimization, then the optimization takes place 808. The request can be optimized if necessary 810 so that association only takes place when it needs to take place (e.g., if restrictions are known due to previous requests, then apply previous restrictions without associating the request). It is possible that there is no need to run a classifier. If inputs to a classification did not change and the request can be associated without executing classifier code, then there is no need to run a classifier.

Each incoming request is assigned with a workload group 810. This means that the request becomes part of a workload group. The workload group represents a set of user queries chosen by a user that makes the request. Any request in the workload group is governed by a group policy established for the group 812. The group policy commonly contains limits to individual requests in the workload group.

For example, there can be two users: 'User A' and 'User B'. 'User A' is a high-level executive with top-level clearance and authority. 'User B' is a clerical worker with minimal clearance and authority. 'User B' makes a request to store a personal file folder in server storage. Following the 'User B' request, 'User A' make a request to store critical information in the same server storage. Though similar requests, each request has creates a different set of queries.

Each request is assigned to a workload group. However, due to the difference of requesters and information, the requests are assigned to different workload groups. Each workload group becomes part of a resource pool. Since 'User A' has a more important request then 'User B', the 'User A' request can be allocated more resources. Therefore, a more equitable distribution of resources can take place then with a conventional method.

The following several examples is computer code of various features of the subject specification in accordance with an SQL server. Disclosed syntax is commonly not the only way in which to implement the disclosed features.

The following is an example of making configuration changes with appropriate syntax:

---

ALTER RESOURCE GOVERNOR
{ENABLE | DISABLE |
RECONFIGURE [SET CLASSIFIER FUNCTION TO
{<schema_name>.<function_name> | NULL}]}

---

Enabling Resource Governor will also do work normally done by RECONFIGURE statement and could be avoided in final implementation (e.g., only RECONFIGURE STATEMENT can be used).

The following is an example of explicit syntax:

Workload group context of the session can be changed using the following syntax

SET WORKLOAD GROUP 'group_name'

The subject specification can be adopted to solve a wide arrange of problems. For example, it can introduce action statements to group policy, which would allow a user to choose an action other then a default action. The following is an example of this syntax.

---

CREATE WORKLOAD GROUP groupForcedAction
SET
{    REQUEST_MAX_CPU_TIME_SEC = 30 ACTION
TERMINATE; }

---

Similarly, a new resource can be added to a pool specification; for example CPU affinity can be added. The following are specific examples of implementation of the subject specification. It is to be appreciated that these are provided for explanation purposes and in no manner should they limit the subject specification.

Classification Function

Classification UDF will potentially run before any request and returns the name of a workload group to use for that request.

Requirements on classification function:

Classification UDF provided by DBA must return sysname and have no parameters.

A new DDL statement that will allow DBA to register their UDF with resource governor.

Resource governor would only keep a single UDF, there will be no chaining.

The following existing intrinsic functions could be used to aid classification:

HOST_NAME( ), APP NAME( ), SUSER_NAME( ), SUSER_SNAMEO, IS_SRVROLEMEMBER( ), IS_MEMBER( )

The following intrinsic is to be implemented to expose additional connection properties to help with classification:

CONNECTIONPROPERTY (option)

The expectation from the intrinsic is that it will return the same values for the options as the corresponding columns in sys.dm_exec_connections for the unique connection that this request came on. The options are:

| Option | Data Type | Description |
| --- | --- | --- |
| NET_TRANSPORT | nvarchar(40) | Returns the physical transport protocol that is used by this connection, Is not nullable. |
| PROTOCOL_TYPE | nvarchar(40) | Returns the protocol type of the payload. It currently distinguishes between TDS (TSQL) and SOAP. Is nullable. |
| AUTH_SCHEME | nvarchar(40) | Returns the SQL Server authentication scheme for a connection. The mechanism for Windows authentication (NTLM, KERBEROS, DIGEST, BASIC, NEGOTIATE) or SQL for authentication. Is not nullable. |
| LOCAL_NET_ADDRESS | varchar(48) | Returns the IP address on the server that this connection targeted. Available only for connections using the TCP transport provider, Is nullable. |
| LOCAL_TCP_PORT | int | Returns the server TCP port that this connection targeted if it were a connection using the TCP transport. Is nullable. |

| Option | Data Type | Description |
| --- | --- | --- |
| CLIENT_NET_ADDRESS | varchar(48) | Asks for the address of the client connecting to this server. Is nullable. |
| <Any other string> | | NULL = Input is not valid. |

Classification Function Example

This function would classify an administrator (sa) into workload group named G1 and all others into group named G2:

```
CREATE FUNCTION RESOURCE_GOVERNOR_CLASSIFIER ( )
RETURNS SYSNAME
BEGIN
    DECLARE @val varchar(16)
    if 'sa' = SUSER_SNAME( )
        SET @val = 'G1';
    else
        SET @val = 'G2';
    return @val;
END
```

Pool definition and modification (NOTE: Some syntax is repeated in more detail).

```
{CREATE | ALTER} RESOURCE POOL {pool_name | "default" }
[SET
{
    ([MIN_CPU_PERCENT = value]
    [[,]MAX_CPU_PERCENT = value]
    [[,]MIN_MEMORY_PERCENT = value]
    [[,]MAX_MEMORY_PERCENT = value])
}]
[;]
DROP RESOURCE POOL pool_name
[;]
```

Checks:

SET is not optional on ALTER, at least one value pair has to be specified in the SET

*PERCENT values range is between 0 and 100, integers only

Sum of MINs for all pools (excluding System is default) should be less than or equal to 100

You cannot drop the pool if there are groups referring to it.

Group definition and modification

```
CREATE WORKLOAD GROUP group_name
[SET <Policy specification>]
[USING {pool_name | "default"}]
[;]
ALTER WORKLOAD GROUP {group_name |" default"}
[SET <Policy specification>]
[USING {pool_name | "default"}]
[;]
DROP WORKLOAD GROUP group_name
[;]
<Policy specification> ::=
{
    ([IMPORTANCE = {LOW | MEDIUM | HIGH}]
    [[,] REQUEST_MAX_MEMORY_GRANT_PERCENT = value]
    [[,] REQUEST_MAX_CPU_TIME_SEC = value]
    [[,] REQUEST_RESOURCE_GRANT_TIMEOUT_SEC = value]
    [[,] GROUP_MAX_REQUESTS = value])
}
```

Checks

CREATE/DROP is not allowed on Default group. ALTER is allowed

REQUEST_MAX_MEMORY_GRANT_PERCENT should be in 0 to 100 range, integers only

REQUEST_MAX_CPU_TIME is a non-negative integer number

REQUEST_RESOURCE_GRANT_TIMEOUT_SEC is non-negative integer number

GROUP_MAX REQUESTS should be a positive integer number 1.1.5 Syntax Usage Scenarios This collection of use case scenarios illustrates how resource governor can be used to resolve or manage resource issues in different scenarios.

Each scenario builds on the actions taken in the preceding scenario.

Scenario 1: A user has a new version of SQL Server and would like to make use of resource governor, how can a user use it in an environment?

Consider using resource governor for monitoring resource consumption by workloads.

Actions:

Create workload groups specific to your workloads (in the following example 3 groups are created).

Create classification function.

Register the classification function with resource governor.

Enable resource governor.

Monitor performance counters and query DMVs that will return information about resource usage by workloads.

The configuration is shown in FIG. 7

```
BEGIN TRAN 900
-- create groups with all default settings
CREATE WORKLOAD GROUP groupAdhoc 902
CREATE WORKLOAD GROUP groupReports 904
CREATE WORKLOAD GROUP groupAdmin 906
-- create classification function
-- note that anything that does not get classified goes into 'Default'
group 708
CREATE FUNCTION rgclassifier_v1( ) RETURNS SYSNAME
WITH SCHEMABINDING
AS
BEGIN
    IF (SUSER_NAME( ) = 'sa')
        RETURN 'groupAdmin'
    IF (APP_NAME( ) LIKE '%MANAGEMENT STUDIO%') OR
    (APP_NAME( ) LIKE '%QUERY ANALYZER%')
        RETURN 'groupAdhoc'
    IF (APP_NAME( ) LIKE '%REPORT SERVER%')
        RETURN 'groupReports'
END
COMMIT TRAN
```

```
GO
-- register the function with RG
ALTER RESOURCE GOVERNOR RECONFIGURE SET
CLASSIFIER FUNCTION TO dbo.rgclassifier_v1
GO
-- enable RG with new configuration
ALTER RESOURCE GOVERNOR ENABLE
GO
```

Scenario 2 (based on Scenario 1): Based on monitoring results a user wants to see an event anytime a query in the ad-hoc group (groupAdhoc) runs longer than 30 sec.

Actions:

```
Change the policy for the ad-hoc group
Monitor SQL Trace event (RG management class event)
Perform an action on the event (for example, ignore, send an email, a page, execute KILL command)
    -- alter the policy to specify the limit on CPU
    -- an event will be generated when the limit is reached
    ALTER WORKLOAD GROUP groupAdhoc
    SET (REQUEST_MAX_CPU_TIME_SEC = 30)
    GO
    -- notify the resource governor about the changes
    ALTER RESOURCE GOVERNOR RECONFIGURE
    GO
```

Scenario 3 (based on Scenario 2): This is to further restrict the ad-hoc group so it does not exceed 50% of CPU usage when all requests are cumulated.

Actions:

Put the ad-hoc group into a distinct pool (in the above examples, they were all using Default resource pool)

Create a new pool and set limits on it

Configure the group to use the new pool

The configuration is shown in FIG. 8.

```
BEGIN TRAN
-- create new pool and set max CPU on it
CREATE RESOURCE POOL poolAdhoc 1002
SET (MAX_CPU_PERCENT = 50)
-- move adhoc group to use the newly created pool
ALTER WORKLOAD GROUP groupAdhoc
USING poolAdhoc 1004
GO
COMMIT TRAN
GO
-- notify the resource governor about the changes
ALTER RESOURCE GOVERNOR RECONFIGURE
GO
```

Figure 9:
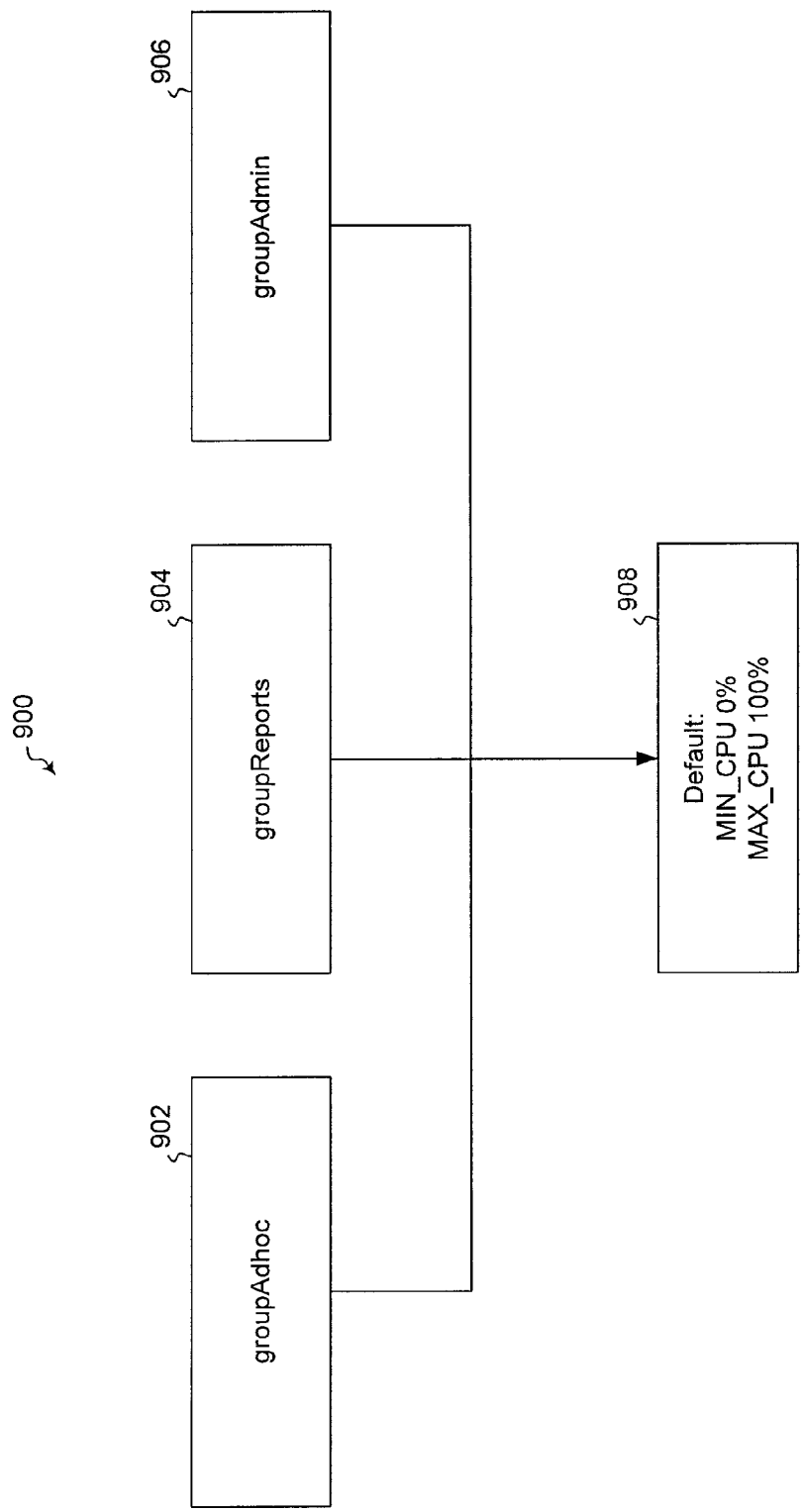
FIG. 9 illustrates a representative configuration in accordance with an aspect of the subject specification.
Figure 10:
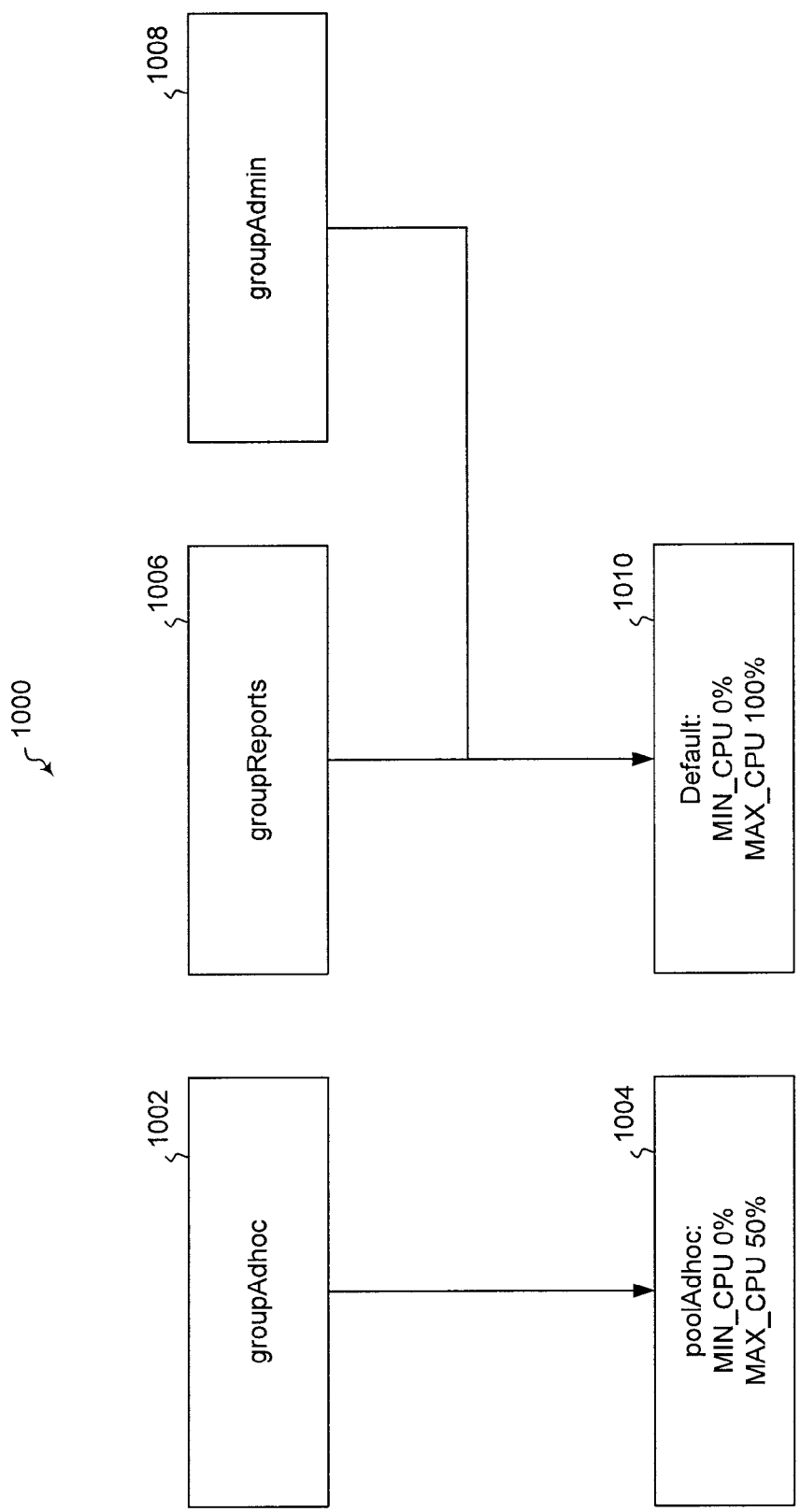
FIG. 10 illustrates a representative configuration in accordance with an aspect of the subject specification.
Figure 11:
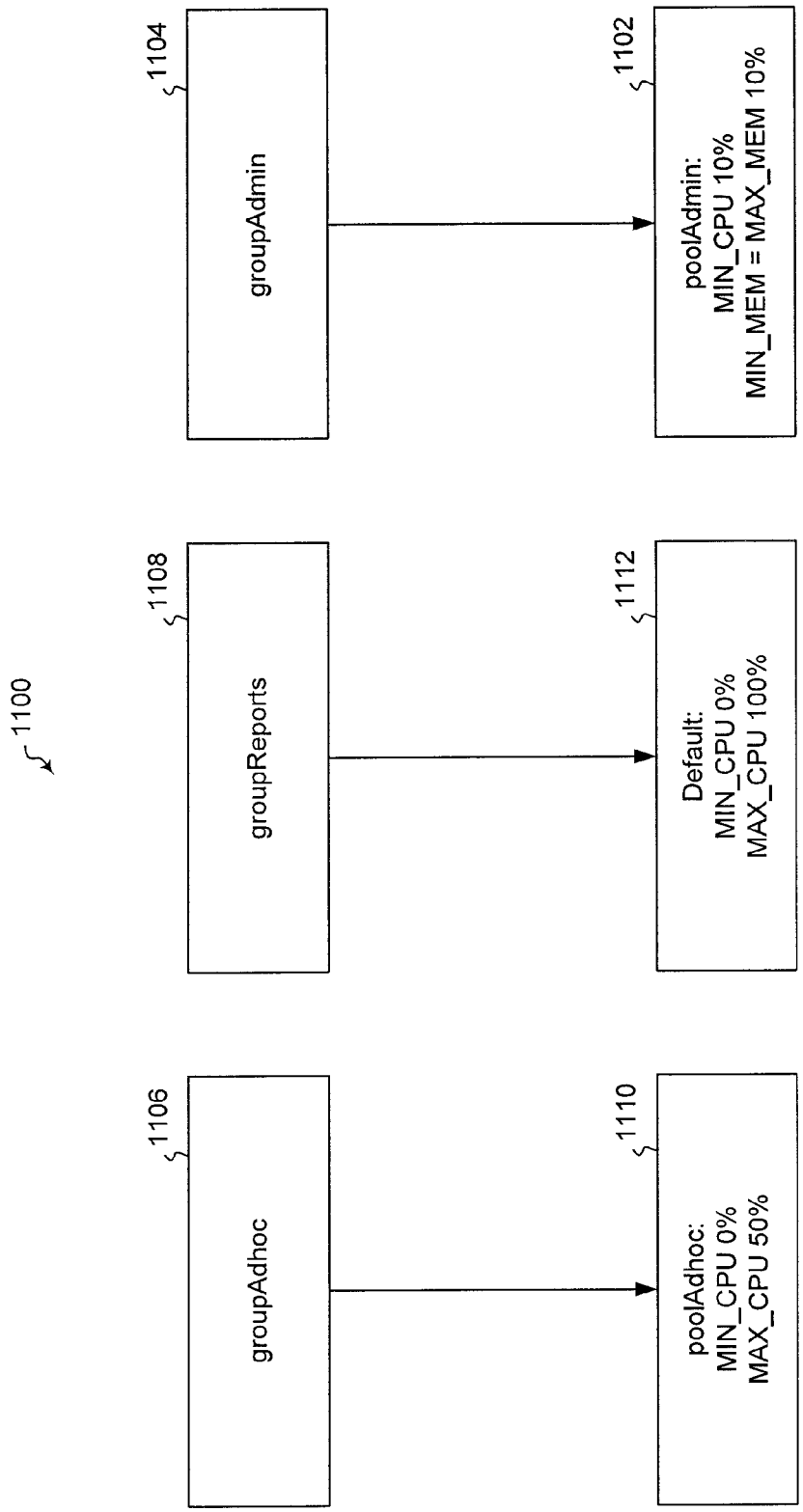
FIG. 11 illustrates a representative configuration in accordance with an aspect of the subject specification.

The remaining groups 1006 and 1008 as well as the remaining pool 1010 continue to function as they did in accordance with FIG. 9.

Scenario 4 (based on Scenario 3): A user can want to guarantee that the admin group always has resources to run diagnostic queries, but these queries should not take more than 10% of the server memory resources.

Actions:

Put the admin group into a distinct pool

Create a new pool and set limits on it

Configure the group to use the new pool

The configuration is shown in FIG. 9

```
BEGIN TRAN
-- create new pool and set limits
CREATE RESOURCE POOL poolAdmin 1102
SET (
    MIN_CPU_PERCENT = 10,
    MIN_MEMORY_PERCENT = 10,
    MAX_MEMORY_PERCENT = 10
    -- note that we do not restrict MAX CPU on this pool
)
-- move admin group to use the newly created pool
ALTER WORKLOAD GROUP groupAdmin 1104
USING poolAdmin
GO
COMMIT TRAN
GO
-- notify the resource governor about the changes
ALTER RESOURCE GOVERNOR RECONFIGURE
GO
```

The remaining groups 1106 and 1108 as well as the remaining pools 1110 and 1112 continue to function as they did in accordance with FIG. 9.

Scenario 5 (based on Scenario 4): Since reports are currently in the Default resource pool, but using a separate resource group (groupReports), a user can want to ensure that anything in the Default resource group has lower resource usage priority that reports.

Actions:

1. Change the policy on the default group.

Note: You can change the policy of the default group, but not the default pool. If you think you need to change the default pool, this is a strong indicator that you need to create a separate pool for the group using it.

```
-- alter policy on the default group
ALTER WORKLOAD GROUP DEFAULT
SET (IMPORTANCE = LOW)
GO
-- notify the resource governor about the changes
ALTER RESOURCE GOVERNOR RECONFIGURE
GO
```

Scenario 6 (independent from previous scenarios): When a user wants to add a new group:

```
BEGIN TRAN
CREATE RESOURCE POOL mypoolnew
CREATE WORKLOAD GROUP mygroupnew USING mypool
CREATE FUNCTION rgclassifier_v2 ( ) RETURNS
SYSNAME AS
BEGIN
    If suser_sname( ) = 'DOMAIN\username'
        RETURN 'mynewgroup'
    ELSE
        RETURN 'mygroup'
END
COMMIT TRAN
GO
ALTER RESOURCE GOVERNOR RECONFIGURE SET
CLASSIFIER FUNCTION TO dbo.rgclassifier_v2
GO
DROP FUNCTION dbo.rgclassifier_v1
GO
```

Scenario 7 (based on scenario 6): When a user wants to drop a group (2-step process):

```
BEGIN TRAN
CREATE FUNCTION rgclassifier_v3 ( ) RETURNS SYSNAME
AS
BEGIN
    If suser_sname( ) = 'DOMAIN\username'
        RETURN 'mygroup'
END
COMMIT TRAN
GO
ALTER RESOURCE GOVERNOR RECONFIGURE SET
CLASSIFIER FUNCTION TO dbo.rgclassifier_v3
GO
--- Wait for all current sessions using 'mynewgroup' to drain (or kill)
BEGIN TRAN
GO
DROP WORKLOAD GROUP mygroupnew
GO
DROP RESOURCE POOL mynewpool
GO
COMMIT TRAN
GO
ALTER RESOURCE GOVERNOR RECONFIGURE
GO
```

Figure 12:
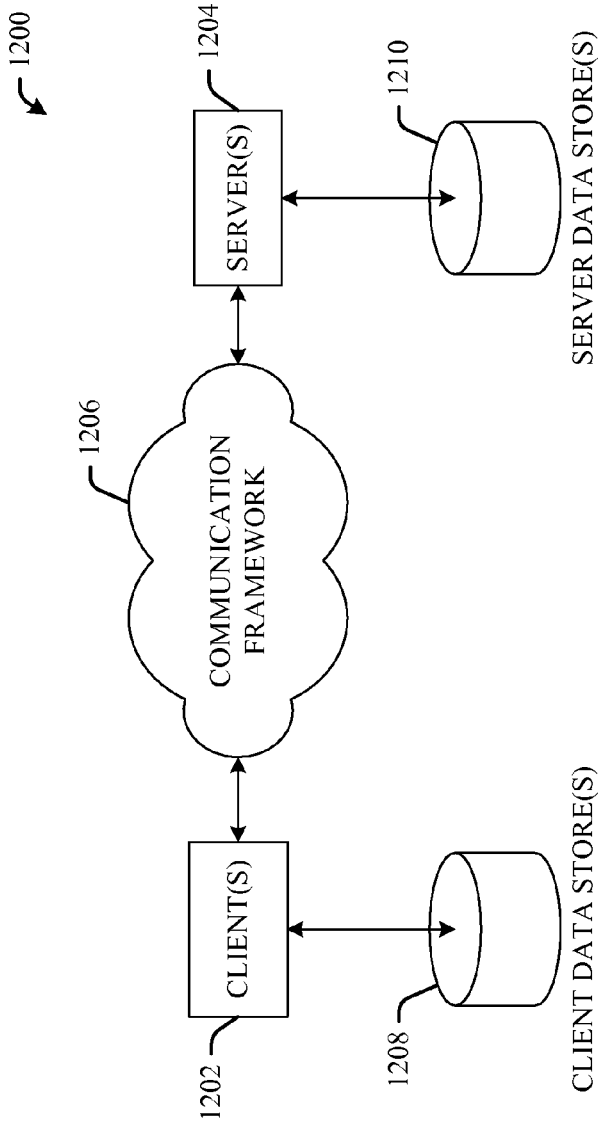
FIG. 12 illustrates an example of a schematic block diagram of a computing environment in accordance with the subject specification.

Referring now to FIG. 12, there is illustrated a schematic block diagram of a computing environment 1200 in accordance with the subject specification. The system 1200 includes one or more client(s) 1202. The client(s) 1202 can be hardware and/or software (e.g., threads, processes, computing devices). The client(s) 1202 can house cookie(s) and/or associated contextual information by employing the specification, for example.

The system 1200 also includes one or more server(s) 1204. The server(s) 1204 can also be hardware and/or software (e.g., threads, processes, computing devices). The servers 1204 can house threads to perform transformations by employing the specification, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

Figure 13:
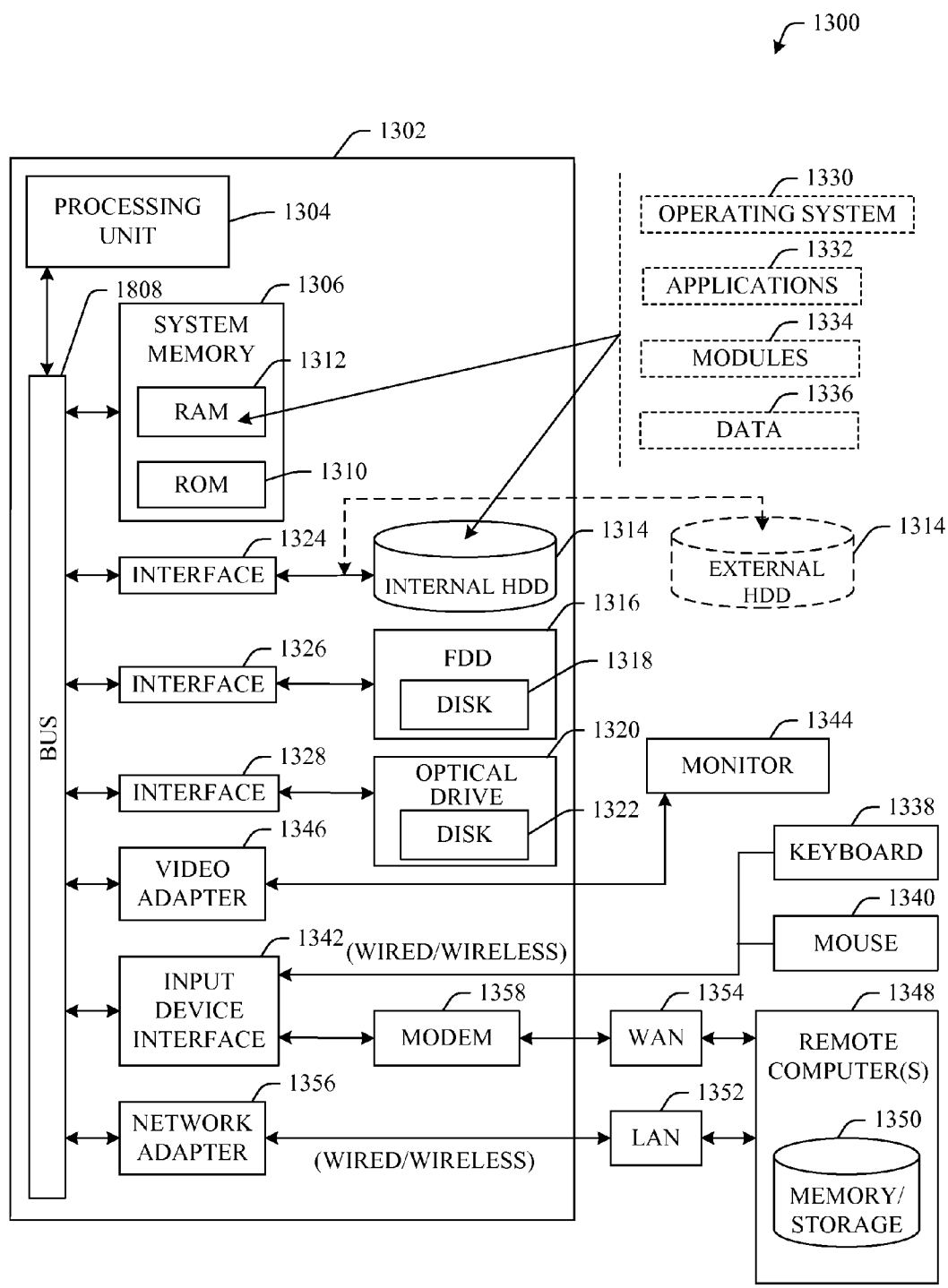
FIG. 13 illustrates an example of a block diagram of a computer operable to execute the disclosed architecture.

Referring now to FIG. 13, there is illustrated a block diagram of a computer operable to execute the disclosed architecture. In order to provide additional context for various aspects of the subject specification, FIG. 13 and the following discussion are intended to provide a brief, general description of a suitable computing environment 1300 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the example environment 1300 for implementing various aspects of the specification includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the specification can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are example and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising: is interpreted when employed as a transitional word in a claim.

What is claimed is:

1. A system for enforcing system resource usage limits on query requests accessing a database based on grouping query requests into workload groups and based on assigning workload groups to resource pools, the system comprising:
at least one processor; and
one or more computer storage devices having stored thereon computer executable instructions that, when executed by the at least one processor, implement a method, comprising:
defining a plurality of workload groups, wherein each workload group is configured to be assigned one or more query requests and comprises one or more resource policies that govern access permitted to the one or more query requests to use system resources that are made available to the workload group, wherein the resource policies place limits on the use of system resources by the one or more query requests, the plurality of workload groups in a default workload group and other workload groups;
defining a plurality of resource pools, wherein each resource pool is configured to be assigned one or more of the plurality of workload groups and defines an arrangement of system resources that are available to the one or more workload groups, and wherein each resource pool comprises one or more pool policies that govern resource consumption by query requests whenever a plurality of workload groups are assigned to the resource pool, the plurality of resource pools including a default resource pool that defines an arrangement of system resources available to the default workload group;
defining a classifier function that associates incoming query requests with the plurality of workload groups based on attributes of the incoming query requests, the classifier function associating any incoming query request not associated any of the other workload groups to the default workload group;
receiving a particular query request;
associating the particular query request with a particular workload group of the plurality of workload groups based, at least in part, on the classifier function and an attribute of the particular query request, the particular workload group comprising the default workload group whenever it is determined that the particular query request is not associated with any of the other workload groups;
assigning the particular workload group to a particular resource pool of the plurality of resource pools that is associated with a portion of system resources, thereby making the portion of the system resources available to the particular workload group, the particular resource pool comprising the default resource pool when the particular workload group comprises the default workload group; and
governing access permitted to the particular query request to system resources using a particular resource policy of the particular workload group and a particular pool policy of the particular resource pool, wherein the governing includes:
limiting the portion of the system resources available to the particular workload group as per the particular pool policy; and
limiting the use of the portion of system resources available to the particular workload group by the particular query request as per the particular resource policy.

2. The system of claim 1, wherein the particular query request is a first query request, the method further comprising:
subsequently receiving a second query request; and
associating the second query request with the particular workload group based on knowledge of the previous association of the first query request with the particular workload group.

3. The system of claim 1, wherein associating the particular query request with the particular workload group comprises determining that the particular query request is not associated with any of the other workload groups, and associating the particular query request with the default workload group and associating the default workload group with the default resource pool.

4. The system of claim 1, wherein associating the particular query request with the particular workload group comprises associating the particular query request with a system workload group, selected from one or more system workload groups, that comprises query requests that are executed on behalf of the system, and associating the system workload group with at least one system resource pool.

5. The system of claim 1, wherein defining the classifier function comprises receiving user input specifying one or more rules for the classifier function.

6. The system of claim 1, further comprising deteimining that the particular query request is authorized to be made at the system.

7. A method for enforcing system resource usage limits on query requests accessing a database based on grouping query requests into workload groups and based on assigning workload groups to resource pools, the method comprising:
defining a plurality of workload groups, including a default workload group, wherein each workload group is configured to be assigned one or more query requests and comprises one or more resource policies that govern access permitted to the one or more query requests to use system resources that are made available to the workload group, and wherein the resource policies place limits on the use of system resources by the one or more query requests;
defining a plurality of resource pools, including a default resource pool corresponding to the default workload group, wherein each resource pool is configured to be assigned one or more of the plurality of workload groups and defines an arrangement of system resources that are available to the one or more workload groups, and wherein each resource pool comprises one or more pool policies that govern resource consumption by query requests whenever a plurality of workload groups are assigned to the resource pool;
defining a classifier function that associates incoming query requests with one of the plurality of workload groups based on one or more attributes of the incoming query requests, the classifier function associating the incoming query requests with the default workload group when the one or more attributes of the incoming query requests do not associate the incoming query requests with any other workload group;
receiving a particular query request;
associating the particular query request with a particular workload group of the plurality of workload groups based, at least in part, on the classifier function and an attribute of the particular query request;
assigning the particular workload group to a particular resource pool of the plurality of resource pools that is associated with a portion of system resources, thereby making the portion of the system resources available to the particular workload group; and governing access permitted to the particular query request to system resources using a particular resource policy of the particular workload group and a particular pool policy of the particular resource pool, wherein the governing includes:

limiting the portion of the system resources available to the particular workload group as per the particular pool policy; and limiting the use of the portion of system resources available to the particular workload group by the particular query request as per the particular resource policy.

8. The method of claim 7, wherein the particular query request comprises a user request.

9. The method of claim 7, wherein the particular resource pool is a first resource pool, and wherein the first resource pool and a second resource pool overlap, such that the first and second resource pools are both assigned a first portion of the computer system resources.

10. The method of claim 9, wherein the first resource pool includes a second portion of the computer system resources that is unique to the first resource pool, and wherein the second resource pool includes a third portion of the computer system resources that is unique to the second resource pool.

11. The method of claim 7, wherein the particular resource pool includes at least one pool policy that defines a prioritization between the particular workload group and at least one different workload group when the particular workload group and the different workload group are both assigned to the particular resource pool.

12. The method of claim 7, wherein governing access permitted to the particular query request further includes:

stopping the particular query request;

permitting another query request to use the portion of system resources that were previously used by particular query request; and subsequently resuming the particular query request.

13. The method of claim 7, further comprising:

receiving a second query request; and associating the second query request with the particular workload group, wherein limiting the use of the portion of system resources available to the particular workload group by the particular query request as per the particular resource policy, both at an individual request level and at an overall level, comprises limiting access to the particular request based on the second query request also using the portion of system resources available to the particular workload group.

14. The method of claim 7, defining a plurality of resource pools comprises defining at least one resource pool has a minimum portion of system resources not shared by any other resource pool, as well as an effective maximum portion of system resources available to the at least one resource pool.

15. The method of claim 14, wherein the effective maximum portion is 100 minus the sum of one or more minimum portions of other resource pools.

16. The method of claim 14, wherein free system resources between the minimum portion and the effective maximum portion are shared with one or more other resource pools.

17. The method of claim 7, wherein associating the particular query request with a particular workload group comprises automatically creating the particular workload group.

18. The method of claim 7, wherein the attribute of the particular query request comprises a type of user that created the request.

19. The method of claim 18, wherein the classifier classifies query requests from a first type of user to a first workload group and query requests from a second type of user to a second workload group.

20. The method of claim 7, wherein the resource policies place limits on the use of system resources by corresponding query requests both at an individual request level that places limits on the individual request singly, as well as at an overall level that places limits on all the corresponding query requests as a group.

21. One or more computer storage devices having stored thereon computer executable instructions that, when executed by at least one processor of a computer system, implement a method for enforcing system resource usage limits on query requests accessing a database based on grouping query requests into workload groups and based on assigning workload groups to resource pools, the method comprising:

defining a plurality of workload groups, wherein each workload group is configured to be assigned one or more corresponding query requests and comprises one or more resource policies that govern access permitted to the one or more corresponding query requests to use system resources that are made available to the workload group, wherein the resource policies place limits on the use of system resources by the one or more corresponding query requests, the plurality of workload groups including a default workload group to which query requests not associated with any other workload group are assigned;

defining a plurality of resource pools, wherein each resource pool is configured to be assigned one or more corresponding workload groups of the plurality of workload groups and defines an arrangement of system resources that are available to any of the one or more corresponding workload groups, and wherein each resource pool comprises one or more pool policies that govern resource consumption by query requests in circumstances when a plurality of workload groups are assigned to the resource pool, the plurality of resource pools including a default resource pool that defines an arrangement of system resources available to query requests associated with the default workload group;

defining a classifier function that associates incoming query requests with one of the plurality of workload groups based on attributes of the incoming query requests;

receiving a particular query request;

associating the particular query request with a particular workload group of the plurality of workload groups based, at least in part, on the classifier function and an attribute of the particular query request, the particular workload group comprising the default workload group when no attribute of the particular query request associates the particular query request with any other workload group in the plurality of workload groups;

assigning the particular workload group to a particular resource pool of the plurality of resource pools that is associated with a portion of system resources, thereby making the portion of the system resources available to the particular workload group, the particular resource pool comprising the default resource pool when no attribute of the particular query request associates the particular query request with any other workload group; and governing access permitted to the particular query request to system resources using a particular resource policy of the particular workload group and a particular pool policy of the particular resource pool, wherein the governing includes:
limiting the portion of the system resources available to the particular workload group as per the particular pool policy; and
limiting the use of the portion of system resources available to the particular workload group by the particular query request as per the particular resource policy.

* * * * *

UNITED STATES PATENT AND TRADEMARK OFFICE
CERTIFICATE OF CORRECTION

PATENT NO.       : 8,065,682 B2
APPLICATION NO.  : 11/679520
DATED            : November 22, 2011
INVENTOR(S)      : Boris Baryshnikov et al.

Page 1 of 1

It is certified that error appears in the above-identified patent and that said Letters Patent is hereby corrected as shown below:

In column 19, line 19, in Claim 1, delete "in" and insert -- including --, therefor.

In column 20, line 26, in Claim 6, delete "deteimining" and insert -- determining --, therefor.

Signed and Sealed this
Fourteenth Day of February, 2012

David J. Kappos
*Director of the United States Patent and Trademark Office*